(12) United States Patent
Tsukamoto

(10) Patent No.: US 8,933,900 B2
(45) Date of Patent: Jan. 13, 2015

(54) INPUT DEVICE AND METHOD OF MANUFACTURING THE SAME

(75) Inventor: Koji Tsukamoto, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 173 days.

(21) Appl. No.: 13/402,774

(22) Filed: Feb. 22, 2012

(65) Prior Publication Data

US 2012/0249453 A1    Oct. 4, 2012

(30) Foreign Application Priority Data

Mar. 29, 2011  (JP) ................. 2011-072496

(51) Int. Cl.
*G06F 3/041* (2006.01)
*G06F 3/044* (2006.01)
*G02F 1/1333* (2006.01)

(52) U.S. Cl.
CPC ............... *G06F 3/041* (2013.01); *G06F 3/044* (2013.01); *G02F 1/13338* (2013.01); *G06F 2203/04103* (2013.01)
USPC ...................................................... 345/173

(58) Field of Classification Search
USPC .................................. 345/156–184
See application file for complete search history.

(56) References Cited

U.S. PATENT DOCUMENTS

| | | | |
|---|---|---|---|
| 7,030,860 B1 * | 4/2006 | Hsu et al. ............... | 345/173 |
| 8,537,135 B2 * | 9/2013 | Chih-Yung et al. ............ | 345/174 |
| 2009/0096759 A1 * | 4/2009 | Nishiwaki et al. ............ | 345/173 |
| 2009/0140987 A1 * | 6/2009 | Yang ............................. | 345/173 |
| 2010/0283762 A1 * | 11/2010 | Takusa ......................... | 345/174 |
| 2011/0109590 A1 | 5/2011 | Park | |
| 2011/0169751 A1 | 7/2011 | Kim et al. | |
| 2011/0234520 A1 | 9/2011 | Chan | |
| 2011/0254778 A1 * | 10/2011 | Wang et al. .................... | 345/173 |
| 2011/0279402 A1 * | 11/2011 | Yoo et al. ..................... | 345/174 |
| 2011/0298728 A1 * | 12/2011 | Kim et al. ..................... | 345/173 |
| 2012/0068960 A1 | 3/2012 | Kim et al. | |
| 2012/0098782 A1 * | 4/2012 | Nam ............................. | 345/174 |

FOREIGN PATENT DOCUMENTS

| | | | | |
|---|---|---|---|---|
| EP | 2090966 A1 * | 8/2009 | ............. | G06F 3/044 |
| EP | 2124137 | 11/2009 | | |
| JP | 2007-18226 | 1/2007 | | |
| JP | 2009-193587 | 8/2009 | | |
| JP | 2009-301767 | 12/2009 | | |
| JP | 2010-182137 | 8/2010 | | |
| JP | 2010182137 | * 8/2010 | ............. | G06F 3/045 |
| WO | 2009/157645 | 12/2009 | | |

OTHER PUBLICATIONS

Notice of Reasons for Rejection dated May 1, 2012 from Japanese Application No. 2011-072496.

(Continued)

*Primary Examiner* — Kumar Patel
*Assistant Examiner* — Amy C Onyekaba
(74) *Attorney, Agent, or Firm* — Beyer Law Group LLP

(57) ABSTRACT

A touch panel includes a transparent panel, a decorative layer which is formed in a decorative region on a first surface of the transparent panel, a transparent electrode which is formed from a transparent input region of the first surface to a surface of the decorative layer, and a wiring layer which is formed to extend to the surface of the decorative layer and electrically connected to the transparent electrode.

20 Claims, 3 Drawing Sheets

(56) References Cited

OTHER PUBLICATIONS

Office Action dated Oct. 8, 2013 from U.S. Appl. No. 13/401,750.
Final Office Action dated Mar. 21, 2014 from U.S. Appl. No. 13/401,750.

Heche, "Transparent Carbon Nanotube Films Likely Successor to ITO for Commercial Application", Apr. 2009, http://phys.org/news 158587561.html.
Office Action dated Jul. 18, 2014 from U.S. Appl. No. 13/401,750.

* cited by examiner

INPUT DEVICE AND METHOD OF MANUFACTURING THE SAME

CLAIM OF PRIORITY

This application claims benefit of Japanese Patent Application No. 2011-072496 filed on Mar. 29, 2011, which is hereby incorporated by reference.

BACKGROUND OF THE INVENTION

1. Field of the Invention

The present invention relates to an input device (touch panel which is used in combination with a liquid crystal display or the like, and a method of manufacturing the same.

2. Description of the Related Art

As described in Japanese Unexamined Patent Application Publication No. 2009-301767, a touch panel includes a transparent surface panel (transparent substrate 23), a decorative layer (light-shielding layer 24) which is formed in a decorative region below the surface panel, a transparent planarizing layer (overcoat layer 25) which is formed over the entire region of the lower surfaces of the surface panel and the decorative layer, and transparent electrodes (transparent conductive layer 26) which are formed in the lower surface of the planarizing layer, and the like.

In Japanese Unexamined Patent Application Publication No. 2009-301767, transparent resin, such as photosensitive acrylic resin is spin-coated to form the planarizing layer.

However, in the configuration in which the planarizing layer is formed of a resin layer by spin coating, in particular, the degree of planarization of the planarizing layer is degraded due to a step between the surface panel and the decorative layer, or the like. For this reason, there is a problem in that the transparent electrodes may not be formed on the planarized surface, causing deterioration in sensor sensitivity.

In Japanese Unexamined Patent Application Publication No. 2009-301767, since a planarizing layer is necessary, the touch panel increases in thickness, and there is a problem in that it is difficult to appropriately achieve a reduction in thickness.

A process for manufacturing a touch panel of the related art includes printing of a decorative layer printing, deposition of transparent electrodes, such as ITO (Indium Tin Oxide), pattern formation by photolithography, and bonding of base materials. In this way, a plurality of complex manufacturing process techniques are required, leading to an increase in instrument investment cost or process technique development cost. Accordingly, the manufacturing process is extended, causing deterioration in productivity.

In a touch panel described in Japanese Unexamined Patent Application Publication No. 2009-193587, a decorative layer (mask layer 12), a planarizing layer (smoothing layer 15), and transparent electrodes (sensing circuit 13) are laminated in a decorative region below a surface panel (single substrate 11). Accordingly, there are the same problems as those in Japanese Unexamined Patent Application Publication No. 2009-301767.

SUMMARY OF THE INVENTION

The present invention provides a thin input device having satisfactory sensor sensitivity.

The present invention also provides a method of manufacturing an input device based mainly on a printing process.

An input device according to an aspect of the invention includes a transparent base material, a decorative layer which is formed in a decorative region on a first surface of the transparent base material, a transparent electrode which is formed from a transparent input region of the first surface to a surface of the decorative layer, and a wiring layer which is formed to extend to the surface of the decorative layer and electrically connected to the transparent electrode.

According to the aspect of the invention, both the decorative layer and the transparent electrode are formed on the same first surface of the transparent base material. At this time, according to the aspect of the invention, the transparent electrode is formed from the transparent input region of the first surface to the surface of the decorative layer, and the wiring layer which is electrically connected to the transparent electrode are formed on the surface of the decorative layer. Accordingly, there is no case where the wiring layer appears in the transparent input region, such that electrical connection between the wiring layer and the transparent electrode in the decorative region can be stabilized. The transparent electrode is formed to the surface of the decorative layer 3, such that a portion of the decorative region can also be used as the input region, thereby extending the input region.

According to the aspect of the invention, since the transparent electrode is formed on the same flat first surface as the decorative layer, the transparent electrode can be formed on the planarized surface compared to a case where the transparent electrode is formed on the surface of the planarized layer by spin coating or the like, thereby obtaining excellent sensor sensitivity. Unlike the related art, since it is not necessary to form the planarizing layer, it is possible to realize reduction in thickness compared to the related art.

The decorative layer, the transparent electrode, and the wiring layer may be printed.

A protective layer may be provided on the first surface to cover the surface of the transparent electrode and the wiring layer. Therefore, it is possible to appropriately protect the transparent electrode and the wiring layer.

A lateral surface of the decorative layer which defines the boundary between the transparent input region and the decorative region may be an inclined surface which is inclined in a direction away from the transparent input region, and the transparent electrode may be formed from the transparent input region of the first surface to the inclined surface. Therefore, it is possible to form the transparent electrode from the transparent input region of the first surface to the surface of the decorative layer simply and stably.

The transparent base material may be a transparent panel whose second surface opposite to the first surface is an operating surface. Therefore, it is possible to more effectively realize reduction in thickness of the input device.

The transparent electrodes may have a single-layer structure. Therefore, it is possible to more effectively realize reduction in thickness of the input device.

A method of manufacturing an input device according to another aspect of the invention includes the steps of printing a decorative layer in a decorative region on a first surface of a transparent base material, printing a transparent electrode from a transparent input region of the first surface to a surface of the decorative layer, and printing a wiring layer electrically connected to the transparent electrode on the surface of the decorative layer.

According to the aspects of the invention, since the main process for forming the decorative layer, the transparent electrode, and the wiring layer is performed using printing, unlike the related art, a plurality of process techniques are not required, thereby suppressing instrument investment cost or manufacturing process time and improving productivity.

The method may further include the step of, after printing the wiring layer, forming a protective layer on the first surface to cover the surface of the transparent electrode and the wiring layer. The transparent electrodes may be formed on the first surface with a single-layer structure.

With the input device according to the aspect of the invention, since the transparent electrode is formed on the same flat first surface as the decorative layer, the transparent electrode can be formed on the planarized surface compared to a case where the transparent electrode is formed on the surface of the planarizing layer by spin coating or the like, thereby obtaining excellent sensor sensitivity. Unlike the related art, since it is not necessary to form the planarizing layer, it is possible to realize reduction in thickness compared to the related art.

With the method of manufacturing an input device according to another aspect of the invention, since the main process for forming the decorative layer, the transparent electrode, and the wiring layer is performed using printing, unlike the related art, a plurality of process techniques are not required, thereby suppressing instrument investment cost or manufacturing process time and improving productivity.

DESCRIPTION OF THE PREFERRED EMBODIMENTS

Figure 1:
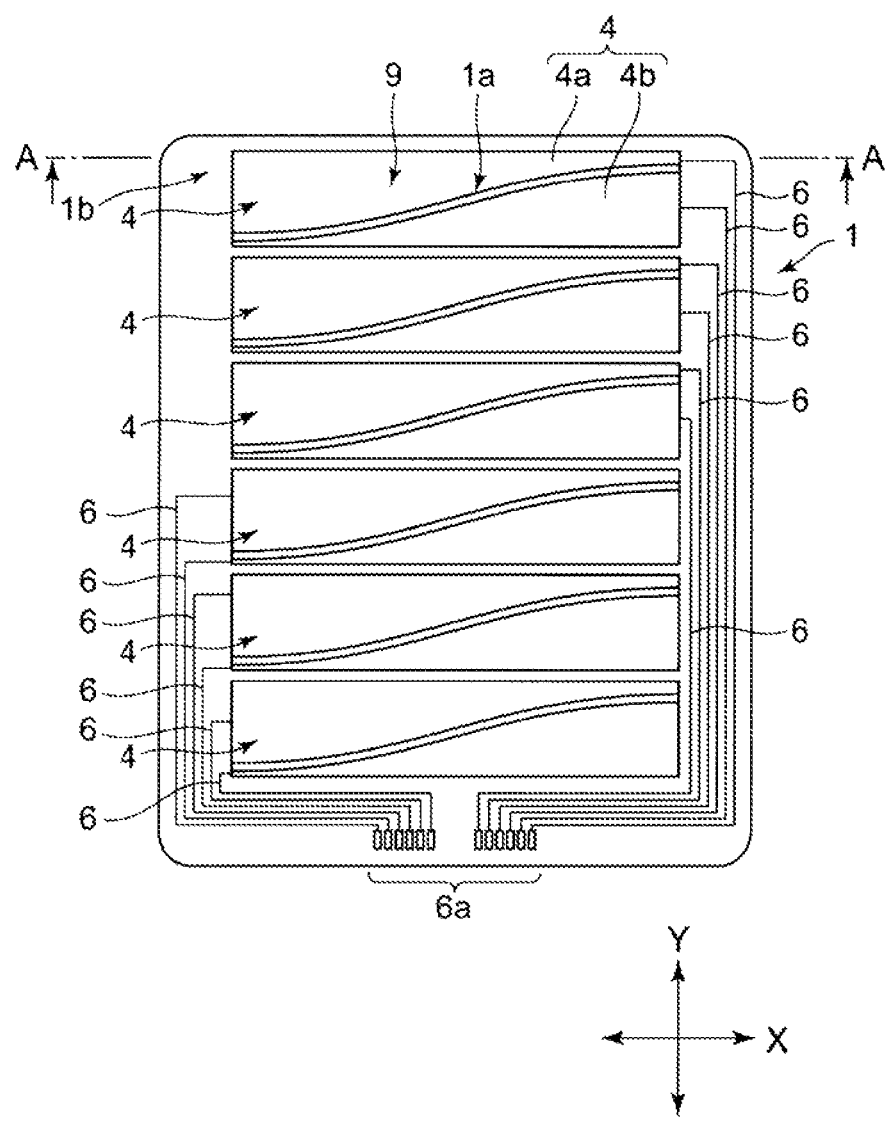
FIG. 1 is a plan view of a capacitance type touch panel (input device) in this embodiment.
Figure 2:
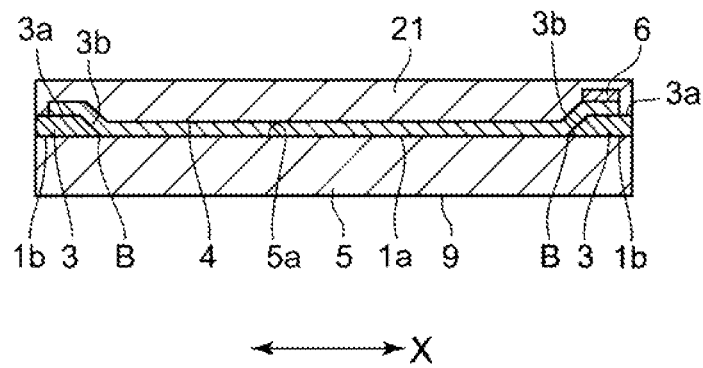
FIG. 2 is a longitudinal sectional view of the touch panel shown in FIG. 1 when taken along the line A-A and viewed in the direction of the arrow.

FIG. 1 is a plan view of a capacitance type touch panel (input device) in this embodiment. FIG. 2 is a longitudinal sectional view of the touch panel shown in FIG. 1 when taken along the line A-A and viewed in the direction of the arrow (an operating surface 9 turns downward).

A touch panel 1 of this embodiment has a transparent panel 5 in a surface layer, a decorative layer 3, transparent electrodes 4, wiring layers 6, a protective layer 21, and the like.

The terms "transparent" and "transmission property" used herein refers to a state where visible light transmittance is equal to or greater than 60% (preferably, equal to or greater than 80%). It is preferable that the haze value is equal to or smaller than 6.

FIG. 2 which is a longitudinal sectional view of FIG. 1 shows a state where the transparent panel 5 in the layer is on the lower side. Accordingly, in FIG. 2, the lower surface of the transparent panel 5 is an operating surface 9.

The transparent panel 5 is formed of glass, transparent plastic, or the like, and the material is not particularly limited. The transparent panel 5 may have a flat shape as a whole or may be a housing shape.

As shown in FIG. 2, the colored decorative layer 3 is formed in a decorative region 1b on a first surface (a rear surface opposite to the operating surface 9) 5a of the transparent panel 5. The decorative region 1b is provided in a shape surrounding the periphery of a transparent input region 1a. Although the decorative layer 3 is formed by, for example, screen printing, the printing method is not particularly limited. The decorative region 1b in which the decorative layer 3 is formed is non-transmissive, and the transparent input region 1a is transmissive. Although any material can be used for the decorative layer 3, when the decorative layer 3 is conductive, it is necessary to form an insulating layer to overlap the entire surface 3a of the decorative layer 3. Although the insulating layer is non-transmissive or transmissive, when the insulating layer spreads out of the lateral surface of the decorative layer 3 into the transparent input region 1a, the insulating layer is transparent.

As shown in FIG. 2, the transparent electrodes 4 are formed from the transparent input region 1a on the first surface 5a of the transparent panel 5 to the surface 3a of the decorative layer 3. The term "the surface 3a of the decorative layer 3" used herein refers to a surface which corresponds to the rear surface of the touch panel 1 when viewed from the operating surface 9 or corresponds to the lower surface if the operating surface 9 turns toward the upper surface. As shown in FIG. 1, the transparent input region 1a is provided over the wide range at the center of the touch panel 1. In this embodiment, the transparent input region 1a has, but is not limited to, a rectangular shape.

As shown in FIG. 1, the transparent electrodes 4 each have a pair of a first transparent electrode 4a and a second transparent electrode 4b separately formed, and a plurality of sets are formed at an interval in the Y direction. In this embodiment, although the shapes of the first transparent electrode 4a and the second transparent electrode 4b are not limited, the first transparent electrode 4a and the second transparent electrode 4b are formed to change in width in the Y direction gradationally or in a stepwise manner toward the X direction.

For the transparent electrodes 4, any materials may be used as long as the material is printable, and the material is not particularly limited. For example, examples of a conductive material include PEDOT/PSS-containing conductive ink, Ag nanowire-containing conductive ink, and carbon nanotube-containing conductive ink. In regard to the printing method, screen printing, ink jet printing, thermal transfer, or the like may be used. The same is applied to the printing method of the decorative layer 3 or the wiring layers 6.

As shown in FIG. 2, a lateral surface 3b of the decorative layer 3 which defines the boundary B between the transparent input region 1a and the decorative region 1b is an inclined surface (hereinafter, referred to as an inclined surface 3b) which is inclined in a direction away from the transparent input region 1a. As shown in FIG. 2, the transparent electrodes 4 are formed from the transparent input region 1a of the first surface 5a to the inclined surface 3b of the decorative layer 3.

as shown in FIGS. 1 and 2, a plurality of wiring layers 6 are formed to partially overlap the transparent electrodes 4 and to extend to the flat surface 3a of the decorative layer 3. In this way, since the wiring layers 6 are formed on the surface 3a of the decorative layer 3, unlike FIG. 1, the wiring layers 6 are not actually visible from the operating surface 9 of the touch panel 1 as shown in FIG. 1. Meanwhile, in FIG. 1, the wiring layers 6 are visible through the decorative layer 3. The wiring layers 6 are formed by, for example, screen printing, and the printing method is not particularly limited.

The wiring layers 6 are formed of a metal material, such as Ag, Cu, Cu alloy, CuNi alloy, or Ni. For example, the wiring layers 6 are formed by printing Ag paste.

The wiring layers 6 are wired in the surface 3a of the decorative layer 3 and, as shown in FIG. 1, are packed together in a portion which is connected to a flexible printed board (not shown). The tips of the wiring layers 6 form an external connection portion 6a which is electrically connected to the flexible printed board (not shown).

As shown in FIG. 2, the protective layer 21 is provided on the first surface 5a of the transparent panel 5 to cover the surfaces of the transparent electrodes 4 and the wiring layers 6. The protective layer 21 is a hard coat film (transparent protective layer) in which a hard coat layer, such as urethane acrylate, is formed on the surface of a thin PET base material. The protective layer 21 may be adhered to the exposed surfaces of the transparent electrodes 4 and the wiring layers 6 through an optical transparent adhesive layer (OCA). Meanwhile, the protective layer 21 does not cover the surface of the external connection portion 6a, such that the external connection portion 6a can be exposed and connected to the flexible printed board.

In the touch panel 1 shown in FIGS. 1 and 2, if the operator touches or approaches the operating surface 9 of the transparent panel 5 in the surface layer of the touch panel 1 with his/her finger, capacitance between the first transparent electrodes 4a close to the finger and the second transparent electrodes 4b close to the finger changes. Thus, it is possible to calculate the operating position of the finger on the basis of the change in capacitance.

Figure 3:
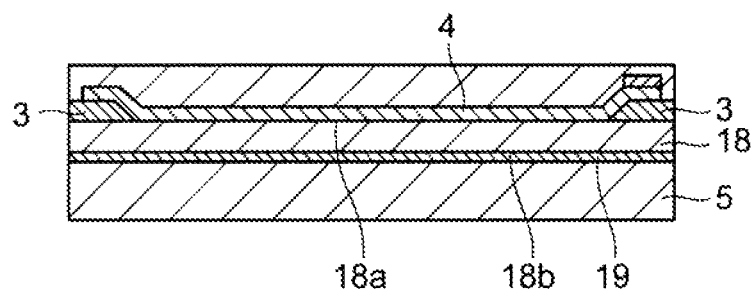
FIG. 3 is a partial enlarged longitudinal sectional view of a touch panel in another embodiment different from FIG. 2.

As shown in FIG. 3, a structure may be made in which a decorative layer 3 and transparent electrodes 4 are formed on a first surface 18a of a transparent base material 18, such as a PET film, and a transparent panel 5 made of glass or transparent plastic is adhered to a second surface 18b (a surface opposite to the first surface 18a) of the transparent base material 18 through an optical transparent adhesive layer (OCA) 19. Meanwhile, as shown in FIG. 2, if the decorative layer 3 and the transparent electrodes 4 are formed on the transparent panel 5 in the surface layer, it is possible to reduce the number of components and to achieve reduction in thickness of the touch panel 1 and improvement in sensor sensitivity.

Figure 4:
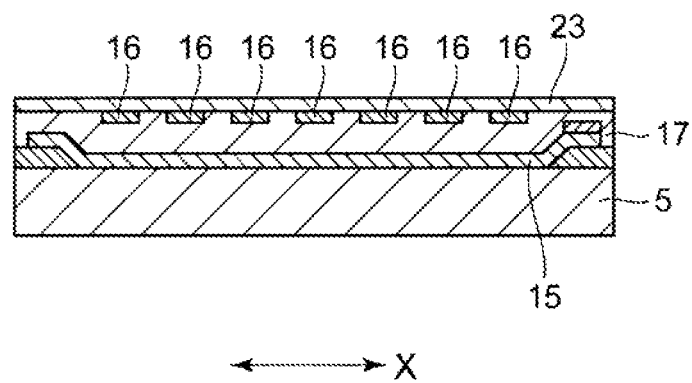
FIG. 4 is a partial enlarged longitudinal sectional view of a touch panel in another embodiment different from FIG. 2.

In a touch panel shown in FIG. 4, a laminated structure is made in which two layers of transparent electrodes 15 and 16 are laminated through a transparent insulating layer 17. At this time, for example, a plurality of transparent electrodes 15 extend in the X direction at an interval in the Y direction, and a plurality of transparent electrodes 16 extend in the Y direction at an interval in the X direction.

As shown in FIG. 4, while transparent electrodes 15 are printed from the transparent input region 1a on the first surface 5a of the transparent panel 5 to the surface 3a of the decorative layer 3, in regard to transparent electrodes 16, a transparent conductive material, such as ITO (Indium Tin Oxide), may be film-formed on the surface of a transparent base material 23, such as a PET film, using sputtering or deposition and patterned using a photolithography technique. The transparent base material 23 on which the transparent electrodes 16 are formed and the transparent panel 5 on which the transparent electrodes 15 are formed may be adhered through an optical transparent adhesive layer (OCA) (transparent insulating layer 17).

Meanwhile, in this embodiment, as shown in FIGS. 1 and 2, the transparent electrodes 4 can have a single-layer structure, thus it is possible to promote reduction in thickness of the touch panel 1.

FIGS. 5A to 5D are process views showing a method of manufacturing the touch panel 1 of this embodiment.

Figure 5A:
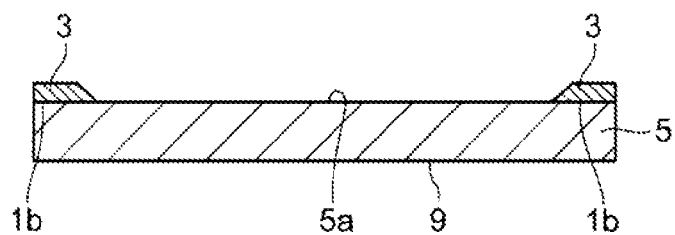
FIGS. 5A to 5D are process views (longitudinal sectional views) showing a method of manufacturing a touch panel in this embodiment.

In the step of FIG. 5A, the decorative layer 3 is printed in the decorative region 1b on the first surface 5a of the transparent panel 5 by screen printing or the like. While the first surface 5a of the transparent panel 5 is a flat surface, the operating surface 9 may not be flat. The transparent panel 5 may form a portion of the housing.

Figure 5B:
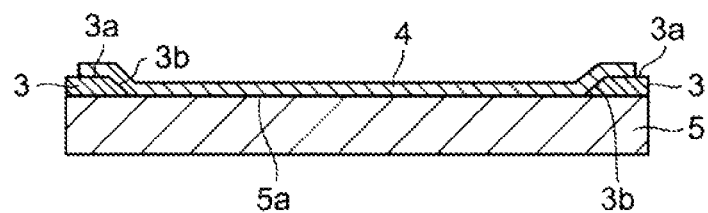

Next, in the step of FIG. 5B, the transparent electrodes 4 are printed from the transparent input region 1a on the first surface 5a of the transparent panel 5 to the inclined surface 3b and the flat surface 3a of the decorative layer 3 in the planar shape shown in FIG. 1 by screen printing or the like.

At this time, since the lateral surface of the decorative layer 3 is the inclined surface 3b, it is possible to form the transparent electrodes 4 from the first surface 5a to the surface 3a of the decorative layer 3 simply and stably.

Figure 5C:
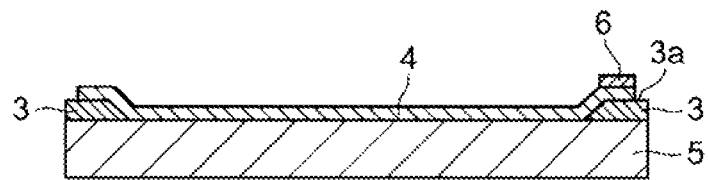

Next, in the step of FIG. 5C, a plurality of wiring layers 6 which overlap the transparent electrodes 4a and 4b (see FIG. 1) in the thickness direction and extend to the surface 3a of the decorative layer 3 are printed by screen printing or the like.

Figure 5D:
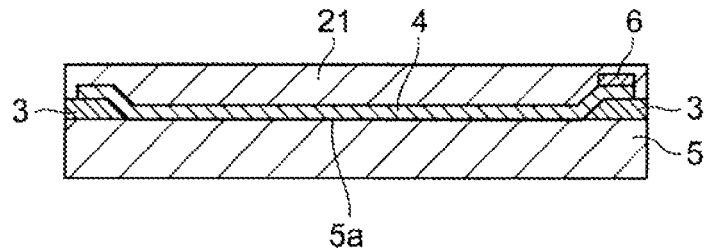

In the step of FIG. 5D, the protective layer 21 is formed on the first surface 5a of the transparent panel 5 to cover the exposed surfaces of the transparent electrodes 4 and the wiring layers 6. The protective layer 21 is, for example, a hard coat film (transparent protective layer) in which a hard coat layer, such as urethane acrylate, is formed on the surface of a thin PET base material. The protective layer 21 may be adhered to the surfaces of the transparent electrodes 4 and the wiring layers 6 through an optical transparent adhesive layer (OCA).

In this embodiment, both the decorative layer 3 and the transparent electrodes 4 are formed on the same first surface 5a of the transparent panel 5. At this time, in this embodiment, the transparent electrodes 4 are formed from the transparent input region 1a of the first surface 5a to the surface of the decorative layer 3, and the wiring layers 6 which are electrically connected to the transparent electrodes 4 are formed on the surface of the decorative layer 3. Therefore, there is no case where the wiring layers 6 appear in the transparent input region 1a, such that electrical connection between the wiring layers 6 and the transparent electrodes 4 in the decorative region 1b can be stabilized. The transparent electrodes are formed to the surface of the decorative layer 3, such that a portion of the decorative region can also be used as the input region, thereby extending the input region.

As described above, in this embodiment, since the transparent electrodes 4 can be formed on the same flat first surface 5a as the decorative layer 3, the transparent electrodes can be formed on the planarized surface compared to a case where the transparent electrodes are formed on the surface of the planarizing layer by spin coating or the like, thereby obtaining excellent sensor sensitivity. Unlike the related art, since it is not necessary to form the planarizing layer, it is possible to realize reduction in thickness compared to the related art.

In the method of manufacturing the touch panel 1 of this embodiment, since the main process for forming the decorative layer 3, the transparent electrodes 4, and the wiring layers 6 is performed using printing, unlike the related art, a plurality of process techniques are not required, thereby suppressing instrument investment cost or manufacturing process time and improving productivity.

The touch panel 1 of this embodiment is a capacitance type, and a liquid crystal display (LCD) (not shown) is arranged on the rear side of the touch panel 1 (the side opposite to the operating surface 9). The display form of the liquid crystal display can be viewed from the transparent input region 1a of the touch panel 1, and in this embodiment, the operator can carry out an input operation while viewing a display form in the transparent input region 1a.

The touch panel (input device) of this embodiment is used in mobile phones, digital cameras, PDAs, game machines, car navigation systems, or the like.

It should be understood by those skilled in the art that various modifications, combinations, sub-combinations and alterations may occur depending on design requirements and other factors insofar as they are within the scope of the appended claims of the equivalents thereof.

What is claimed is:

1. An input device comprising:
    a transparent panel having an operating surface and a rear surface opposite to the operating surface;
    a non-light-transmissive decorative layer directly formed on a decorative region of the rear surface of the transparent panel, the decorative region surrounding a transparent input region of the rear surface, the decorative layer including:
        a flat portion having a same thickness; and
        a tapered portion extending from the flat potion toward the transparent input region with a decreasing thickness such that an edge of the tapered portion of the decorative layer defining a boundary between the transparent input region and the decorative region, the tapered portion forming an inclined surface having an upward slope in a direction away from the transparent input region;
    a transparent electrode directly formed on the transparent input region of the rear surface of the transparent panel, the transparent electrode extending along the inclined surface onto the flat portion of the decorative layer so as to overlap the decorative layer; and
    a wiring layer electrically connected to the transparent electrode by overlapping the transparent electrode, the wiring layer only formed on the transparent electrode where the decorative layer is formed between the transparent panel and the transparent electrode in the decorative region, the wiring layer extending within the decorative region where the decorative layer is formed.

2. The input device according to claim 1,
    wherein the decorative layer, the transparent electrode, and the wiring layer are printed layers.

3. The input device according to claim 1, further comprising:
    a protective layer provided over the rear surface to cover the transparent electrode and the wiring layer.

4. The input device according to claim 3, wherein the protective layer is a hard coat film including a thin PET (polyethylene terephthalate) base material and a hard coat layer formed thereon.

5. The input device according to claim 1,
    wherein the transparent electrode includes a plurality of electrodes having a single-layer structure.

6. The input device according to claim 1, further comprising:
    a second transparent electrode formed on the transparent electrode with a transparent insulating layer interposed therebetween.

7. The input device according to claim 1, further comprising:
    an insulating layer formed between the decorative layer and the wiring layer, and between the decorative layer and the transparent electrode.

8. The input device according to claim 1, wherein the transparent electrode is formed of a conductive ink 9. The input device according to claim 8, wherein the conductive ink is a PEDOT (Poly(3,4-ethylenedioxythiophene))—containing conductive ink or a PSS (polystyrene sulfonates)—containing conductive ink.

10. The input device according to claim 1, wherein the input device is a capacitance-type touch panel.

11. The input device according to claim 1, wherein the rear surface of the transparent panel is substantially flat across the transparent input region and the decorative region.

12. The input device according to claim 1, wherein the transparent electrode is sandwiched between the wiring layer and the decorative layer in the decorative region.

13. A method of manufacturing an input device having a transparent panel having an operating surface and a rear surface opposite to the operating surface, the method comprising:
    printing a non-light-transmissive decorative layer directly on a decorative region of the rear surface of the transparent panel, the decorative region surrounding a transparent input region of the rear surface, the printing of the decorative layer including forming a flat portion having a substantially same thickness and a tapered portion extending from the flat portion toward the transparent input region with a decreasing thickness such that and edge of the tapered portion of the decorative layer defining a boundary between the transparent input region and the decorative region, the tapered portion forming an inclined surface having an upward slope in a direction away from the transparent input region;
    printing a transparent electrode directly on the transparent input region of the rear surface of the transparent panel, the transparent electrode extending along the inclined surface onto the flat portion of the decorative layer so as to overlap the decorative layer; and
    printing a wiring layer overlapping the transparent electrode in the decorative layer so as to be electrically connected to the transparent electrode, the wiring layer only formed on the transparent electrode where the decorative layer is formed between the transparent panel and the transparent electrode, the wiring layer extending within the decorative region where the decorative layer is formed.

14. The method according to claim 13, further comprising:
    after printing the wiring layer, forming a protective layer over the rear surface to cover the transparent electrode and the wiring layer.

15. The method according to claim 14, wherein forming the protective layer includes forming a hard coat film having a thin PET (polyethylene terephthalate) base material and a hard coat layer formed thereon.

16. The method according to claim 13,
    wherein the transparent electrode includes a plurality of electrodes formed on the rear surface with a single-layer structure.

17. The method according to claim 13, wherein the printing transparent electrode is formed by printing a conductive ink.

18. The method according to claim 17, wherein the conductive ink is a PEDOT (Poly(3,4-ethylenedioxvthiophene))—containing conductive ink or a PSS (polvstvrene sulfonates)—containing conductive ink.

19. The method according to claim 13, wherein the input device is a capacitance-type touch panel.

20. The method according to claim 13, wherein the rear surface of the transparent panel is substantially flat across the transparent input region and the decorative region.

* * * * *